United States Patent [19]

Ottenhof

[11] Patent Number: 4,519,945

[45] Date of Patent: May 28, 1985

[54] PROCESS FOR THE PREPARATION OF A PRECIPITATE OF CASEIN AND WHEY PROTEIN

[75] Inventor: Henricus A. W. E. M. Ottenhof, Wageningen, Netherlands

[73] Assignee: Stichting Nederlands Instituut Voor Zuivelonderzoek, Netherlands

[21] Appl. No.: 562,102

[22] Filed: Dec. 16, 1983

[30] Foreign Application Priority Data

Dec. 21, 1982 [NL] Netherlands .................. 8204923

[51] Int. Cl.³ ..................... A23J 1/20; A23J 1/22
[52] U.S. Cl. ............................. 260/119; 260/120; 426/657
[58] Field of Search ............. 260/120, 119; 426/657

[56] References Cited

U.S. PATENT DOCUMENTS

| | | | |
|---|---|---|---|
| 2,623,038 | 12/1952 | Scott | 260/120 |
| 2,665,989 | 1/1954 | Howard et al. | 260/120 X |
| 2,750,374 | 6/1956 | Howard et al. | 260/120 |
| 3,218,173 | 11/1965 | Loewenstein et al. | 260/120 X |
| 3,323,929 | 6/1967 | Salzberg et al. | 260/120 X |
| 3,361,567 | 1/1968 | Engel et al. | 260/120 X |
| 3,535,304 | 10/1970 | Muller et al. | 260/120 |
| 4,376,072 | 3/1983 | Connolly | 260/120 |
| 4,407,747 | 10/1983 | Lippe et al. | 260/120 |
| 4,462,932 | 7/1984 | Lonergan | 260/119 |

FOREIGN PATENT DOCUMENTS

| | | |
|---|---|---|
| 704209 | 2/1954 | United Kingdom . |
| 1151879 | 5/1969 | United Kingdom . |
| 1374019 | 11/1974 | United Kingdom . |
| 1380822 | 1/1975 | United Kingdom . |
| 2063273 | 6/1981 | United Kingdom . |

OTHER PUBLICATIONS

Milk and Milk Products, 4th edition, 1951, Eckles et al., pp. 22–23.
Ottenhof, Brief Communications, XXIst IDF Congress, (Moscow, 1982) vol. 1, Book 2, pp. 89 and 90.
Muller, et al., The Australian Journal of Dairy Technology, Mar. 1967, pp. 12–18.
Smith, et al., The Australian Journal of Dairy Technology, Mar. 1968, pp. 8–14.

Primary Examiner—Howard E. Schain
Attorney, Agent, or Firm—Hopgood, Calimafde, Kalil, Blaustein & Judlowe

[57] ABSTRACT

A process for the preparation of a precipitate of casein and whey protein from a milk product containing casein and whey protein which comprises adjusting the pH of the milk product to a value above 6.8, subjecting the resulting product to a heat treatment whereby the whey protein denatures, cooling the heated product to a temperature below 65° C., reducing the pH of the cooled solution to a value below 5.4 and isolating the resulting precipitate.

13 Claims, No Drawings

PROCESS FOR THE PREPARATION OF A PRECIPITATE OF CASEIN AND WHEY PROTEIN

The invention relates to a process for the preparation of a precipitate of casein and whey protein from a milk product containing casein and whey protein.

A process for the preparation of a coprecipitate of casein and whey protein from skim milk is e.g. known from The Australian Journal of Dairy Technology, March 1967, pages 12–18. According to said known process skim milk is heated at a temperature of 90° C., calcium chloride being added optionally, whereafter precipitation takes place at a pH in the range of from 4.6 to 5.4. In the resulting coprecipitate the casein and the whey protein are bonded together.

GB-A-1,151,879 discloses a method of preparing a milk protein co-precipitate comprising heating skim milk to a temperature at which the milk proteins react together, subsequently precipitating the milk proteins by adding an acid and/or calcium chloride and coagulating and finally separating the coprecipitate obtained. The resulting co-precipitate has a relatively high calcium content and a moderate protein solubility at a pH of 6.7.

GB-A-1,374,019 discloses a method of preparing a coprecipitate of casein and whey protein which comprises mixing from 2 to 10 parts by weight of whey, or a corresponding amount of concentrated whey, or from 0.2 to 1 part by weight of mother liquor of whey which has been used for lactose production, with 1 part by weight of buttermilk or skim milk, adjusting the pH of the resulting mixture to a value in the range of from 6.5 to 7.1 and heating the resulting mixture to at least 80° C. for at least 5 minutes while adding 0.1 to 1.0% by weight of calcium chloride, based on the weight of the mixture before, during or after heating.

Also the product obtained by this process has a relatively high calcium content and a moderate protein solubility at a pH of 6.7.

From Brief Communications XXIst IDF-Congress (Moscow 1982), Vol. 1, Book 2, pages 89 and 90 is known which comprises adding to mixtures of skim milk or buttermilk with delactosed whey concentrate hydrochloric acid or sodium hydroxide solution at a temperature of 20° C. and adjusting in this way the pH of the mixture to different values in the range between 3.0 and 8.0, heating the resulting mixture at 90° C. for 20 minutes, whereafter the pH-value thereof is adjusted to 4.6 or 5.3, heating the mixture subsequently at 95° C. for 1 minute, cooling it 20° C. and isolating the precipitate of casein and whey protein by centrifuging. The protein precipitate appeared to be slightly or moderately soluble at a pH of 6.7 and to have a relatively high calcium content, whereby the possibilities for use thereof are restricted.

It has now been found that a precipitate of casein and whey protein, which is water soluble at a neutral pH, could be obtained, when a specific combination of measures is used.

The process of the invention for the preparation of a precipitate of casein and whey protein from a milk product containing casein and whey protein comprises
(a) adjusting the pH of said milk product to a value above 6.8,
(b) heating the product obtained in step (a) at a temperature and for a time at least sufficient to denature the whey protein,
(c) cooling the product obtained in step (b) to a temperature below 65° C.,
(d) reducing the pH of the cooled solution to a value below 5.4 and
(e) isolating the resulting precipitate.

The precipitate prepared according to the invention is excellently water-soluble at a neutral pH and has a very low calcium content and a very low ash content. The low ash content and the presence of lactalbumin in addition to casein make the product extremely suitable for use in baby food; the low calcium content and the excellent solubility make the product very suitable for use in meat products and foam compositions. Contrary to products of the abovementioned known processes the product of the present invention is no co-precipitate in the meaning of a complex of casein and whey protein. Also in this respect the product prepared according to the invention is distinguished clearly from the known co-precipitates of casein and whey protein.

As such it was known from GB-A-2,063,273 to prepare water soluble denatured whey proteins by adjusting the pH of an aqueous solution of native whey protein to a value above 6.5, heating the resulting solution at a temperature and for a time at least sufficient to denature the whey protein and subsequently cooling. If one uses a de-salted whey protein solution in this known process and reduces its pH to a value in the range of from 4 to 5 after cooling to preferably below 30° C., a precipitate is obtained, which again dissolves in water at a pH of 6.5 to 7. It is surprising that with the application of a process, which shows some similarity with the process according to GB-A-2,063,273, to a non-desalted milk product, which contains in addition to whey protein also casein and calcium, a product is obtained which is soluble at a neutral pH. For, one could have expected that when heating a system, which contains in addition to whey proteins all caseins and moreover relatively much calcium, on one hand interaction between whey protein and casein by means of disulfide bonds and on the other hand aggregation of the formed complexes under the influence of calcium would occur (compare New Zealand Journal of Dairy Science and Technology 13 (1978), page 9). Obviously such interactions do not take place; the resulting precipitate is completely soluble at a pH of 6.7 and has a very low calcium content.

Further it is known from EP-A-0064509 to precipitate whey proteins from non fat milk or dairy whey or from a mixture of non fat milk and dairy whey to form interreacted protein complexes and substantially protein free whey. The protein complex prepared contains the whey proteins in an undenatured form and is essentially free of lactose and ash. The process is carried out a a temperature of from 5° C. to 77° C. by alkalizing the non fat milk or dairy whey to a pH of from 9 to 11, acidifying the resulting mixture to a pH of from 2 to 4 and adjusting the pH of the mixture to the isoelectric point of the protein. Apart from the fact that according to the present invention a denatured whey protein product is obtained it should be noted that for the adjustment of three different pH's during the process considerable amounts of chemicals are necessary, which reduces the value of the remaining serum after the isolation of the whey protein considerably. Moreover, increasing the pH to a value in the range of from 9 to 11 has an unfavourable influence upon the taste of the precipitate.

The process of the invention will now be discussed in detail. If in the description of the present invention reference is made to a precipitate soluble in water at a neutral pH, it should be understood that the precipitate dissolves in water at a pH of from 6.5 to 8.0. In certain cases it is not excluded that the precipitate also dissolves at a pH somewhat below 6.5. At a pH above 8.0 decomposition of the protein very often occurs.

The milk product to be used as a starting material is in general a product with a reduced fat content, in most cases skim milk or buttermilk, which may be enriched with native whey protein, if desired. As a starting material in practice often skim milk is used, which has been pasteurized, e.g. at 68° to 72° C. for 5 to 20 seconds. The pH of the starting material in most cases is about 6.7. For the purpose of the process of the invention it should be increased to above 6.8. The upper limit of the pH-range to be used is not critical. However, at a pH above 8.0 often formation of undesirable compounds takes place and the taste of the final precipitate is influenced in an unfavourable way. Preferably, the pH of the starting material is adjusted to a value in the range of from 7.0 to 7.5 in step (a) of the process of the invention. For the adjustment of the pH an alkaline compound or an ion exchanger may be used. Preferably, a sodium hydroxide solution is used, because sodium hydroxide is generally available and cheap.

After the pH has been adjusted to a value above 6.8, the resulting material is heated in step (b) of the process of the invention in such a way that the whey protein denatures. Suitably the heat treatment is carried out for 5 to 20 minutes at 80° to 100° C., preferably for 8 to 12 minutes at 90° to 98° C. Also an Ultra-High-Temperature (UHT) treatment is possible, such at heating at 130° C. for 60 seconds or heating at 145° C. for 5 seconds or also a temperature-time-combination being in between.

The cooling of the heated product is carried out in step (c) of the process of the invention to a temperature below 65° C. Upon cooling to a temperature above 65° C. it appears that the solubility of the protein is influenced unfavourably. From a practical point of view the mixture is generally cooled to a temperature in the range of from 4° to 45° C.

Thereafter the pH of the cooled solution is reduced to a value below 5.4 in step (d) of the process of the invention. By this acidification a precipitate (also mentioned curd) is obtained. The lower limit of the pH range to be reached is at about 4.2. At a pH of 5.3 a soft curd is obtained having a relatively high calcium content. At a lower pH the calcium content of the curd is also lower, the curd particles themselves becoming stronger. At a pH below 4.2 the casein is dissolved. Preferably the pH is adjusted to a value in the range of from 4.4 to 4.7. The acidification can take place with the aid of mineral acid, e.g. hydrochloric acid, or bacteriologically.

The curd can be separated from the treated milk product in a known way, e.g. by means of decantation or centrifuging or with the aid of seeves or riddles. It is preferred to heat the treated milk product, before the curd is isolated. By heating synersis occurs and the curd particles become stronger. Heating can e.g. take place by means of direct steam injection of by indirect heating. The heating temperature is somewhat dependent on the way, in which previously the acidification has been carried out. After acidification with mineral acid a temperature between 40° C. and 50° C., e.g. of about 45° C., is preferred, whereas after bacteriological acidification in most cases a temperature between 55° C. and 70° C., e.g. of about 60° C. is used.

It is preferred to wash the isolated precipitate thoroughly with an aqueous solution having a pH in the range of 4.2 to 5.4 and preferably of from 4.4 to 4.7 in order to obtain a precipitate which is as pure as possible.

The precipitate prepared according to the invention, which in general contains 35 to 50% by weight of dry solids, can again be dissolved in water at a pH between 6.5 and 8.0. For dissolving casein several processes are known, which can also be used here. By way of example reference is made to NL-A-8004587 and the literature mentioned in that publication. In the process according to NL-A-8004587 milk proteins containing water insoluble casein are passed in a continuous stream through a closed reaction chamber by means of a positive displacement pump together with solubilizers, e.g. sodium hydroxide, and the mixture is converted within this reaction chamber under the influence of shearing forces into a solution having a dry solids content within the range of from 20 to 70% by weight. In this process it is advantageous that before arriving in the reaction chamber the milk proteins are admixed with an alkaline solubilizer until a pH of from 5.0 to 5.3 is reached and thereafter in the reaction chamber such an amount of alkaline solubilizer is added that the pH of the mixture will be at least 6.5.

The calcium content of co-precipitates from skim milk amounts to 0.5 to 0.8% by weight of calcium after the usual way of preparation (The Australian Journal of Dairy Technology, March 1968, pages 8 to 14; vide also example V herein below). The protein solubility of such a product (as determined in the way described hereinafter) is then 72.

If the process, described in Brief Communications XXIst IDF-Congress, is used with exclusively skim milk and the pH is adjusted to a value of 7.5 before heating, a precipitate is obtained having a low calcium content (below 0.2% by weight) and a moderate protein solubility (as determined in the way described hereinafter), viz. 80.

When according to the invention a precipitate is prepared from skim milk (vide example I hereinafter) and the pH is adjusted to above 6.8 before heating and to 4.6 after cooling to below 65° C., a precipitate is obtained having both a low calcium content (0.1% by weight) and a high protein solubility (as determined in the way described hereinafter), viz. about 95.

The following examples illustrate the invention without restricting its scope. In the examples the protein solubility is determined according to the AOCS official method BA 11-65, Nitrogen Solubility Index (NSI), in which determination centrifuging took place at 20,000 x g, however. The ash content mentioned in the examples has been determined according to IDF Standard 89:1979.

EXAMPLE I

The pH of skim milk having a temperature of 4° C. was adjusted to 8.0 in a tank with the aid of a 4N sodium hydroxide solution. Per 1000 liters of skim milk 3.6 l of sodium hydroxide solution were used. Thereafter the skim milk was pumped in an amount of 1500 l/h through a pasteurization apparatus and heated up to 68° C., whereafter the temperature was increased to 96° C. by direct steam injection.

The heated skim milk was maintained for 12 minutes in a heater at 96° C. Thereafter the skim milk was cooled by means of a heat exchanger to 20° C. and the pH was adjusted to 4.5 with the aid of 4N hydrochloric acid. Per 1000 liters of skim milk 18 liters of hydrochloric acid were used. Immediately after the hydrochloric injection the temperature was adjusted at 45° C. by means of direct steam injection.

The curd formed was separated with a Westfalia decanting apparatus, model SDA 230. In this way 136 kg of curd were obtained having a dry solids content of 37% by weight; the protein content was 33.1% by weight. The amount of precipitated protein appeared to be 96% by weight of the amount of protein originally present in the skim milk.

The precipitate was washed in a way usual in the casein preparation, in this case at a pH of 4.6 and at a temperature of 45° C. The washed precipitate was thereafter dissolved with the aid of 4N sodium hydroxide solution in the way disclosed in NL-A-8004587, whereafter the solution having a pH of 6.7 was dried by means of spray-drying. The resulting powder had the following composition:
dry solids content: 96.3% by wt.
protein content: 93.9% by wt.
ash content: 3.2% by wt.
calcium content: below 0.1% by wt.
protein solubility: 95.

EXAMPLE II

In a similar way as described in example I a precipitate of casein and whey protein was prepared, the following modifications being employed, however.

The pH of the skim milk was adjusted to 7.0 with the aid of 4N sodium hydroxide solution. Per 1000 l of skim milk 1.3 l of sodium hydroxide solution was used.

Heating took place by means of direct steam injection at 130° C. for 30 seconds; thereafter cooling was carried out to 30° C.

To the skim milk a starter concentrate was added consisting of a mixture of *Streptococcus lactis* and *Streptococcus cremoris*. The acidification took place at 30° C. for 8 hours until the pH was 4.5.

Before the skim milk was decanted, the temperature was increased to 60° C. by means of direct steam injection.

The resulting precipitate was washed in the way described in example I, dissolved with 4N sodium hydroxide solution (pH of the resulting solution 6.7) and dried by means of spray drying.

The powder obtained had the following composition:
dry solids content: 95.4% by wt.
protein content: 90.2% by wt.
ash content: 3.6% by wt.
calcium content: below 0.1% by wt.
protein solubility: 99.

EXAMPLE III

In a similar way as described in example II a precipitate of casein and whey protein was prepared, the following modifications being employed, however.

The pH of the skim milk having a temperature of 4° C. was adjusted to 8.0, the temperature being maintained for 60 seconds at 130° C. After cooling to 20° C. 4N hydrochloric acid was injected until the pH was 4.5 and thereafter the temperature was increased to 45° C. by means of direct steam injection. The skim milk thus treated was decanted.

The precipitate obtained contained 95% by weight of the proteins originally present in the skim milk.

After the precipitate had been washed, dissolved and dried in the way described in example I, a powder was obtained having the following composition:
dry solids content: 95.4% by wt.
protein content: 91.6% by wt.
ash content: 3.6% by wt.
calcium content: 0.1% by wt.
protein solubility: 98.

Example IV

In a similar way as described in example I a precipitate of casein and whey protein was prepared, the following modifications being employed, however.

The skim milk was mixed at 50° C. with a weakly alkaline resin (Duolite A 368, Dia-Prosim); after increase of the pH the resin was separated. The pH of the treated milk was 7.7. Thereafter the heating, cooling, acidification and isolation steps were carried in conformity with example I.

The amount of the precipitated protein was 96% by weight of the original amount of proteins present in the skim milk.

After washing and dissolving with 4N sodium hydroxide solution a solution having a pH of 7.0 and the following composition, based on the dry solids, was obtained:
protein content: 97.2% by wt.
calcium content: 0.1% by wt.
protein solubility: 93.

EXAMPLE V (comparative example)

With the apparatus described in example I a co-precipitate was prepared from skim milk in a known way. For that purpose the skim milk was heated at the natural pH (pH 6.7) for 12 minutes at 96° C. Thereafter the pH was adjusted to 4.5 at 96° C. with the aid of hydrochloric acid, whereafter the mixture was decanted. The precipitate was thereafter washed in the conventional way, dissolved (pH of the solution 6.7) and dried by means of spray drying.

The composition of the co-precipitate powder obtained was:
dry solids content: 96.0 by wt.
protein content: 91.2% by wt.
ash content: 4.2% by wt.
calcium content: 0.7% by wt.
protein solubility: 72.

The ash content and the calcium content of the product obtained are considerably higher than with the product obtained according to the examples I to IV inclusive, the protein solubility being much lower.

EXAMPLE VI

In a comparative experiment a 10% by weight solution of the powder obtained according to example I and a 10% by weight solution of the co-precipitate powder obtained according to example V were subjected to ultracentrifuging at 90,000 x g for 60 minutes. To the supernatant liquid urea, so-called Tris-buffer (tris-(hydroxymethyl)-aminomethane) and β-mercaptoethanol were added, in such amounts that the urea concentration was 8 molar, the Tris-buffer concentration was 0.76 molar and the β-mercaptoethanol concentration was 0.15% by weight, the pH being 8.6. The protein composition in the liquid was examined with the aid of starch gel electrophoresis. It appeared thereby that in the supernatant liquid of the powder obtained according to example I 96% by weight of the caseins and the whey proteins from the original skim milk were present. In the co-precipitate obtained according to example V only 67% by weight of the proteins originally present in the skim milk were present in the supernatant liquid. They were mainly caseins. Presumably the whey protein-casein-complex present in the coprecipitate solution was removed from the supernatant liquid during centrifuging in the sediment.

EXAMPLE VII

On a laboratory scale the pH of skim milk was adjusted to 7.5 at room temperature with the aid of 4N sodium hydroxide solution. Thereafter the skim milk was heated at 96° C. for 15 minutes. The heated skim milk was divided into 8 portions. The separate portions were cooled to temperatures of from 70° C. to 40° C. Of each of the cooled portions of skim milk the pH was adjusted to 4.6 with the aid of 4N HCl. After separation of the curd this was washed in the way described in example I, whereafter the pH was adjusted at 6.7 with the aid of 4N of sodium hydroxide. In the resulting liquids the protein solubility and calcium content were determined. The following values were obtained:

| Portion | Cooling before precipitation to °C. | NSI | Calcium content, based on the protein, % |
| --- | --- | --- | --- |
| 1 | 70 | 80 | 0.2 |
| 2 | 65 | 80 | 0.2 |
| 3 | 62 | 85 | 0.1 |
| 4 | 60 | 85 | 0.1 |
| 5 | 55 | 90 | 0.1 |
| 6 | 50 | 91 | 0.1 |
| 7 | 45 | 97 | 0.1 |
| 8 | 40 | 99 | 0.1 |

EXAMPLE VIII (comparative example)

The pH of skim milk having a temperature of 4° C. was adjusted to 7.0 with the aid of 4N sodium hydroxide solution. Thereafter the mixture was heated by means of direct steam injection at 130° C. for 60 seconds. Thereafter the system was cooled to 20° C. and the pH was adjusted at 6.6 with the aid of citric acid. The skim milk modified in this way was concentrated and dried. The protein solubility of the resulting powder appeared to be low, viz. 52.

EXAMPLE IX (comparative example)

The pH of skim milk having a temperature of 4° C. was adjusted to 8.0 with the aid of 4N sodium hydroxide solution. The temperature was then brought at 96° C. in conformity with the heating schedule of example I. Thereafter the pH of the skim milk was adjusted at 6.8 with the aid of citric acid. The skim milk modified in this way was concentrated and dried by means of spray drying. The protein solubility in the powder obtained appeared to be 72 only.

I claim:

1. A process for the preparation of a precipitate of casein and whey protein from a milk product containing casein and whey protein, which comprises
    (a) adjusting the pH of said milk product to a value above 6.8,
    (b) heating the product obtained in step (a) at a temperature and for a time at least sufficient to denature the whey protein,
    (c) cooling the product obtained in step (b) to a temperature below 65° C.,
    (d) reducing the pH of the cooled solution to a value below 5.4 and
    (e) isolating the resulting precipitate.
2. The process of claim 1, wherein in step (a) the pH is adjusted to a value in the range of from 7.0 to 7.5.
3. The process of claim 1 or claim 2, wherein in step (a) the pH is adjusted with an alkaline compound or with an ion exchanger.
4. The process of claim 3, wherein as an alkaline compound sodium hydroxide is used.
5. The process of claim 1, wherein in step (b) the heating is carried out for 5 to 20 minutes at 80° C. to 100° C.
6. The process of claim 5, wherein in step (b) the heating is carried out for 8 to 12 minutes at 90° to 98°C.
7. The process of claim 1, wherein in step (b) the heating is carried out at a temperature-time combination in the range of from 130° C. for 60 seconds to 145° C. for 5 seconds.
8. The process of claim 1, wherein in step (c) the product obtained in step (b) is cooled to a temperature in the range of from 4° to 45°C.
9. The process of claim 1, wherein in step (d) the pH is reduced to a value in the range of from 4.4 to 4.7.
10. The process of claim 1, wherein the product obtained in step (d) is subjected to direct steam injection or indirect heating before isolating the precipitate.
11. The process of claim 1, wherein the resulting precipitate is washed with an aqueous liquid having a pH in the range of from 4.2 to 5.4.
12. The process of claim 11, wherein the precipitate is washed with an aqueous liquid having a pH in the range of from 4.4 to 4.7.
13. Precipitate of casein and whey protein prepared according to claim 1.

* * * * *